United States Patent [19]

Allen

[11] 4,176,609

[45] Dec. 4, 1979

[54] ELECTRIC TRANSPORTATION SYSTEM

[76] Inventor: Dillis V. Allen, 221 Hawthorne Ct., Schaumburg, Ill. 60193

[21] Appl. No.: 846,534

[22] Filed: Oct. 28, 1977

[51] Int. Cl.² .............................................. B61J 3/00
[52] U.S. Cl. ..................................... 104/88; 104/245; 191/2
[58] Field of Search ...................... 191/1 R, 2, 46, 49, 191/59.1, 57, 63.2, 63.3, 63.4; 104/34, 88, 94, 139, 140, 245, 247, 89, 130

[56] References Cited

U.S. PATENT DOCUMENTS

| 2,985,479 | 5/1961 | Ortega | 104/245 |
| 3,587,470 | 6/1971 | Wilson | 104/88 |
| 3,847,085 | 11/1974 | Rypinski | 104/89 |
| 4,034,680 | 7/1977 | Hamada | 191/59.1 |

Primary Examiner—Reinhard J. Eisenzopf

[57] ABSTRACT

A transportation system that uses bus-like tire vehicles that travel in an express trackway between the suburbs and the city. The bus-like vehicles also have the capability of driving on conventional roadways in the suburbs and the city for picking people up and dropping them off close to their homes and offices. The bus-like vehicles are electric motor driven so that the motor may receive electric power either from the trackway when the vehicles are on the trackway or from batteries carried by the vehicles when they are off the trackway.

5 Claims, 11 Drawing Figures

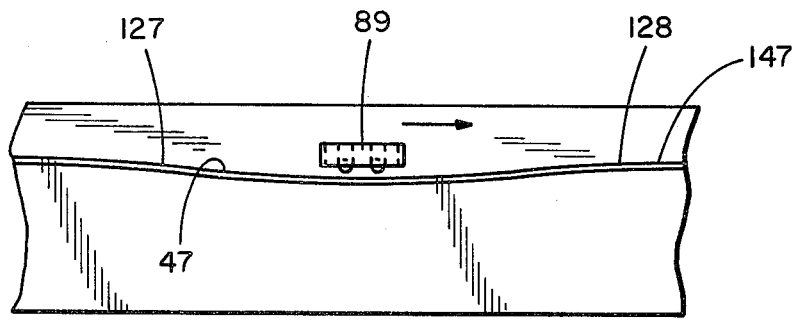
FIG. 8
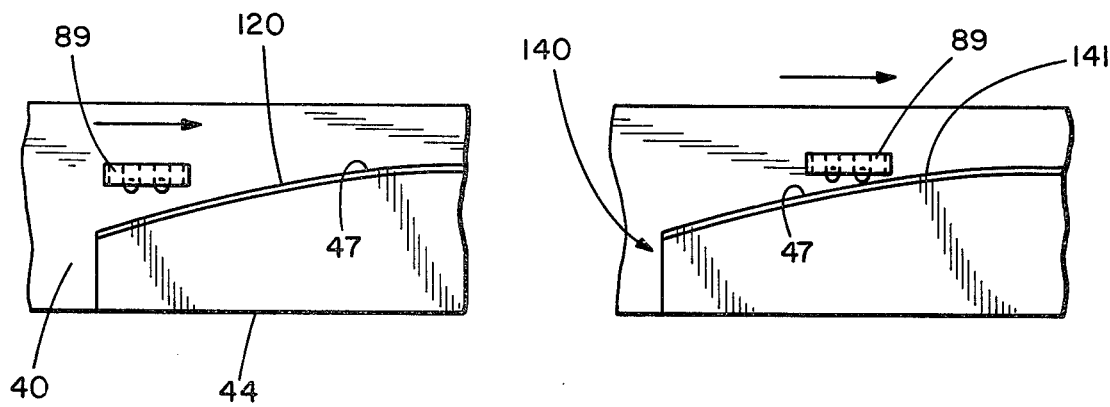
FIG. 9
FIG. 10
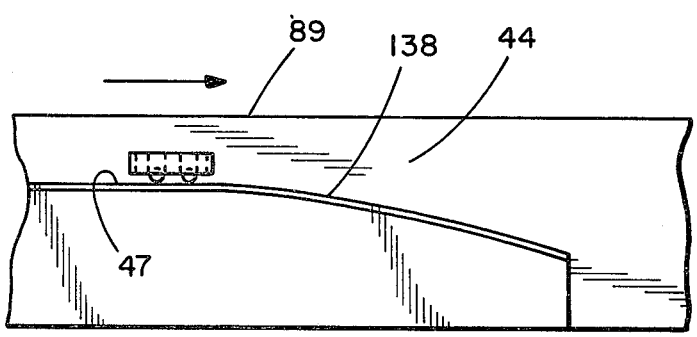
FIG. 11

4,176,609

ELECTRIC TRANSPORTATION SYSTEM

BACKGROUND OF THE INVENTION

The concept of providing tracked vehicles such as street cars, railway cars, elevated transits have gained great acceptance due to their capability of providing mass transportation systems that can efficiently carry large numbers of people in a relatively rapid fashion. Electric buses of course are not new and were quite successful for a short period of time in several cities in the United States including Chicago. Electric buses were found undesirable after a period of time because of their high maintenance cost resulting from difficulty in delivering electric current to the vehicles from a common source.

For this reason, rapid transit systems have been largely confined to hard wheel vehicles, that is, vehicles whose wheels are made of some metal alloy. Hard wheel vehicles however are totally unsuited, at least as we know them as of the present, of traveling and maneuvering on conventional untracked roadways.

By providing a vehicle that is capable of operating both in an express trackway and also locally in the suburbs and city on conventional roadways, one would eliminate the need for local transportation to and from the rapid transit and also local transportation from and to the rapid transit in the city. There is, however, no system presently available that can practically accomplish this result.

With present vehicle technology, I presume that the vehicle used for this purpose, must be an inflatable tire vehicle. Inflatable tire vehicles, like buses, have generally been driven by petroleum consuming internal combustion engines. These conventional buses would achieve some advantage if they were tracked in terms of speed. The cost of a guiding trackway would be prohibitive however in terms of the speed advantage gained.

Electric vehicles have achieved considerable recognition in the late 1970's due to their minimal use of petroleum products at a time when the world's heavy reliance on dwindeling petroleum reserves appears ominus. Electric vehicles presently developed of the type capable of traveling on conventional roadways are of the battery driven type. The progress of development of these vehicles is severely handicapped due to relatively short discharge time for batteries and the relatively low power level so that vehicles must be very small and travel no more than about one hundred miles without an overnight recharge. This type of vehicle would, for these reasons be totally unsuited for any mass transportation system.

SUMMARY OF THE PRESENT INVENTION

In accordance with the present invention, a mass transportation system is provided in which bus-like vehicles picks people up very close to their homes in the residential areas or suburbs, enters an express trackway for high speed travel to the city, leaves the trackway near the city, and drops the people off at a location very near their offices.

This objective is accomplished by providing a trackway with entrances and exits. The trackway accommodates bus-like vehicles with conventional inflatable tire assemblies. Conventional steering mechanisms maneuver the vehicles when they are not on the trackway. When on the trackway, no steering of the vehicles is required because the trackway completely guides the vehicle for non-stop high-speed traffic to and from the city.

The vehicles have four guide assemblies engageable with the trackway, two on front sides and two on the rear sides. The guide assemblies are essentially rollers that engage the trackway and guide the direction of the vehicle.

Each of the vehicles is powered by an electric drive motor from one of two sources of electricity. There is a hot rail in the trackway that supplies electric power to the vehicle's electric motor when the vehicle is on the trackway. When the vehicles are off the trackway driving locally, the vehicles are powered by electric power from battery assemblies carried by each of the vehicles.

The advantages flowing from these systems are many. Firstly, the entire system is not dependent upon any significant use of a petroleum product. Secondly, the disadvantage of conventional battery-powered vehicles has been eliminated. That is, instead of a limited daily capability of less than one hundred miles, these vehicles can run 14 hours a day. This is true because the batteries are charged overnight at a charging station and driven on battery power when picking people up in the morning at their homes. When the bus is full, probably after one hour from leaving the charge station, the bus enters the trackway and turns to hot rail power. While on the trackway the batteries are recharged from their static condition or recharged from the hot rail. Upon exiting the trackway at the inner city location, the vehicles are again switched to battery power, but with recharged batteries. The buses then drop people off near their offices and return to the trackway for the next suburban or residential trip. This continues until night when the vehicle returns to the charge station to again charge the batteries to their maximum charge level.

This invention has eliminated most, if not all, of the disadvantages of electric motor driven vehicles and has permitted large communities of the world to be less dependent upon petroleum products, while at the same time improving the quality of their transportation.

But, what is the specific structure that accomplishes this grandiose system? As I have stated above, the vehicles have two side-mounted roller assemblies at the front and two at the rear. These roller assemblies are raised when the vehicle enters the trackway and then are lowered into engagement with a horizontal guide that also serves the dual purpose of providing a guide onto the "hot rail". Positioning the hot rail at this above-the-ground location also serves to keep the hot rail free of contaminants and provides good electrical contact with the vehicle.

The rollers are mounted on a frame that is movable in a vertical direction to compensate for variations in the guide track to ground dimensions of the track. This, of course, presents a problem for the through traffic vehicles at the entrances and the exits that are to be by-passed for tracked vehicles. I have obviated this problem, without the need of raising the roller assemblies at each entrance and exit, by depressing certain sections of the trackway adjacent the entrances and the exits.

The roller assemblies are also mounted for horizontal movement to accommodate for variations in track width and also to provide a cushioned side ride. Vertical axis pivots are provided for each of the assemblies to accommodate curve steering geometry.

Another problem in this system is the geometry of the vehicle as it enters and travels through curves in the trackway. As one with skill in vehicular steering geometry will appreciate, the inside wheels of a steered vehicle on a turn travel in a different radius than the outside wheel. Therefore, a trackway that engages both left side and right side guideway assemblies in a curve in the trackway would only be possible if the guideway assemblies on the buses were mounted for great horizontal movement. While some horizontal movement of the guideway assemblies with respect to the vehicle is essential, I believe the two or three feet necessary to do this with a twenty-five foot vehicle is quite unacceptable from an engineering standpoint. To obviate this problem, I have eliminated the inside track on the trackway turns so that the vehicle tracks only on the outside track in the curves. The inside guideway assemblies are cammed on and off the trackway in the turns by the inside horizontal trackway surfaces.

BRIEF DESCRIPTION OF THE DRAWINGS

FIG. 8 is a side view of the inside track of a curve;

FIG. 9 is a side view of a track section adjacent an entrance of the trackway;

FIG. 10 is a side view of a track section adjacent an exit of the trackway; and

FIG. 11 is a side view of a track section adjacent the approach of an exit of the trackway.

DETAILED DESCRIPTION OF THE PREFERRED EMBODIMENT

Figure 1:
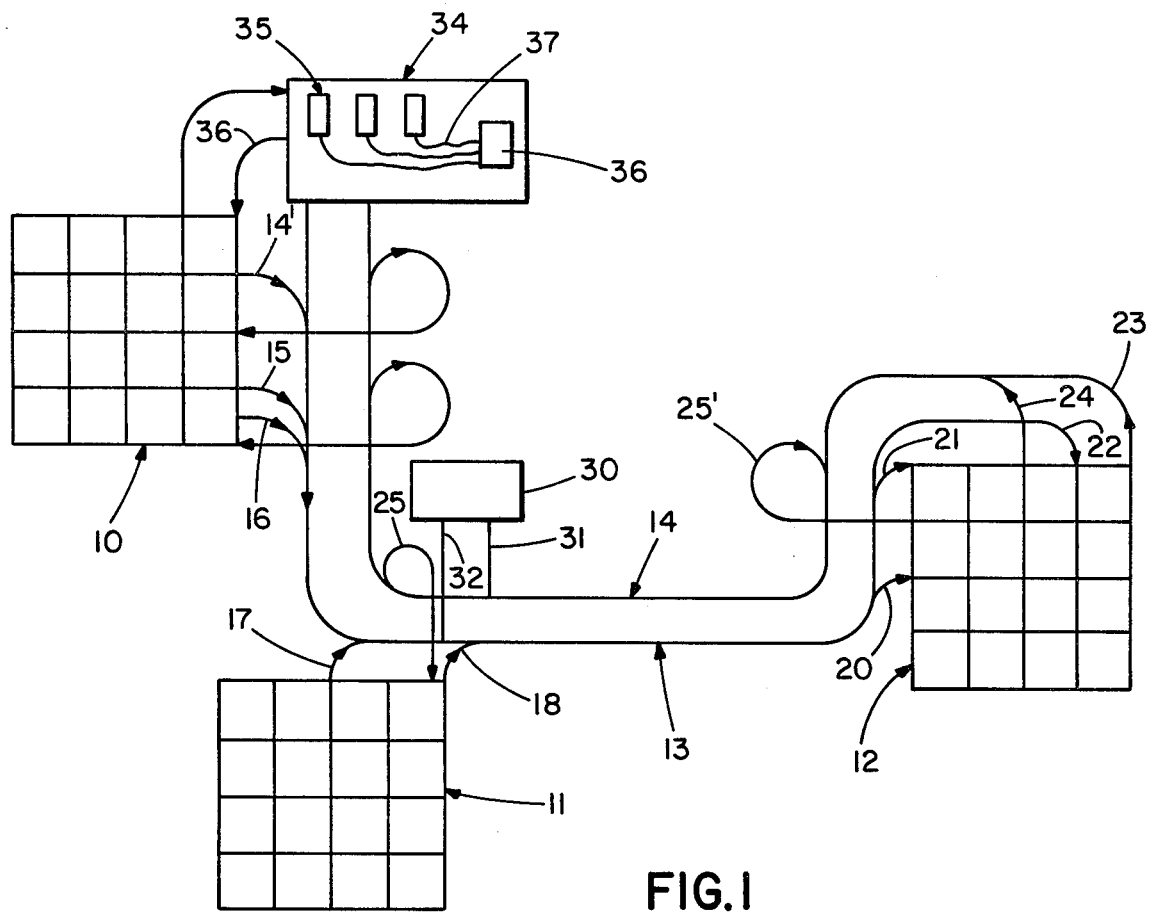
FIG. 1 is a schematic view of the overall transportation system showing the residental areas and the trackways between the residential areas and the inner city.

Referring to the drawings and particularly FIG. 1, the overall system is illustrated in block diagram form. Suburban areas are indicated by grid coordinate blocks 10 and 11 wherein the vertical and horizontal grid lines represent the actual conventional roadways within suburban communities. An innercity is represented by rectangular grid block 12 wherein the horizontal and vertical also represent conventional roadways within an inner city. A city-bound trackway is illustrated by line 13 and an outbound trackway is represented by line 14'. The inbound trackway 13 has a plurality of entrances 14, 15 and 16 from suburban community 10 and entrances 17 and 18 from suburban community 11. The inbound trackway 13 has exits 20, 21 and 22 permitting vehicles on the inbound track to enter the inner city 12.

The outbound track 14 has entrances 23, 24 and 25 from the innercity permitting vehicles from the city to enter the outbound track 14, and exits 25, 26 and 27 permitting vehicles to leave the track 14 and enter the conventional roadways within the suburban communities 10 and 11.

Each of the trackways 13 and 14, as will appear more clearly herein below, has two hot rails which are supplied electric power from a power station 30 through power lines 31 and 32. This enables the vehicles on the tracks to be driven by electric power from station 30 while they are on the tracks.

The vehicles are battery driven when they are off the tracks and are charged overnight at a charge station 34 with the vehicles being represented by blocks 35. A power generator 36 in the power station is connected overnight through lines 37 to the vehicles in the charge station for the purpose of charging the batteries.

In the morning, the charged vehicles enter the suburban community 10 for example on battery power through a conventional roadway 36. The vehicles then run under battery power through the communities in the morning picking up people and enter the trackway through one of the entrances 14, 15, 16, 17 or 18 and proceed down on the track 13. The driver then may release the conventional steering mechanism with the track 13 thereafter guiding the vehicle. Throgh suitable controls the driver switches from battery power to power from the hot rails associated with the track and at the same time, lowers the vehicle guiding assemblies down onto the trackway. As the vehicles approach the innercity, they leave the trackway 13 through exits 20 and 22 by the operator steering the vehicle out of the trackway. The vehicles then drop people off within the city 12 at a location near to where they work on battery power and thereafter return to the outbound trackway 14 through one of the entrances 23, 24 or 25' when the operator again switches from battery power back to hot rail power. The vehicles then leave the trackway through exits 25, 26 or 27 back to the suburban communities where people from the city may be dropped off and additional passengers picked up for another run into the city. The vehicles return to charge stations at night for recharging the batteries.

Figure 5:
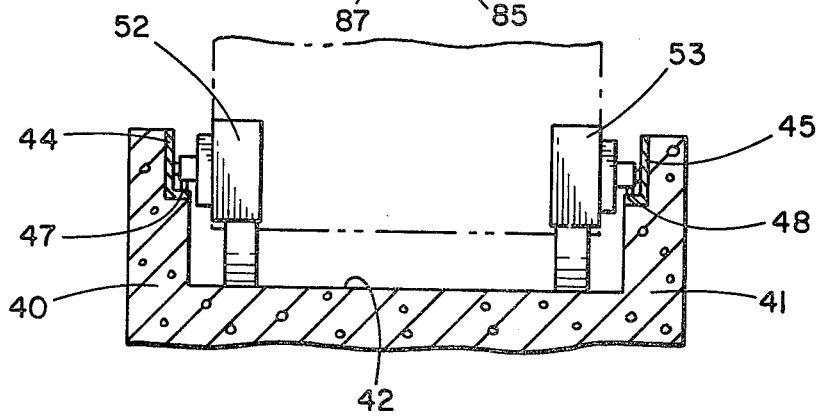
FIG. 5 is a cross-section of the trackway illustrating a vehicle positioned in the trackway in guided mode.
Figure 6:
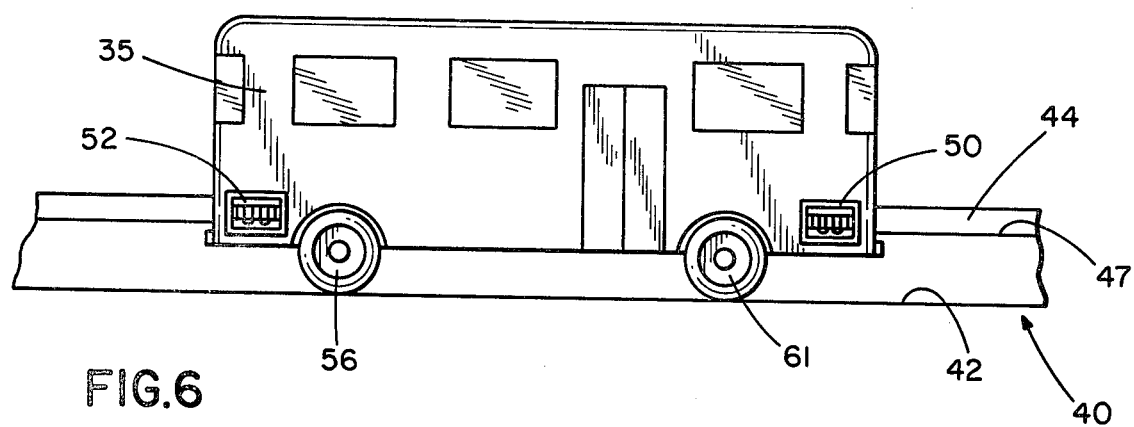
FIG. 6 is a side view of the vehicle in the trackway with the L-shaped side track removed.

The trackway is illustrated in FIGS. 5 and 6 and is seen to include two vertically upstanding concrete walls 40 and 41 interconnected by a horizontal concrete roadway portion 42 that engages the conventional inflatable tire wheel assemblies of the vehicle 35. The concrete upstanding portions 40 and 41 each have formed therein vertically disposed steel walls 44 and 45 for laterally guiding the vehicle or bus 35. Adjacent steel walls 44 and 45 are horizontally disposed hot rails 47 and 48 which serve the dual function of supplying electric power to the vehicles 35 and also for vertically supporting the vehicles guide assemblies. Suitable insulating members (not shown) support the hot rails in concrete portions 40 and 41.

Figure 2:
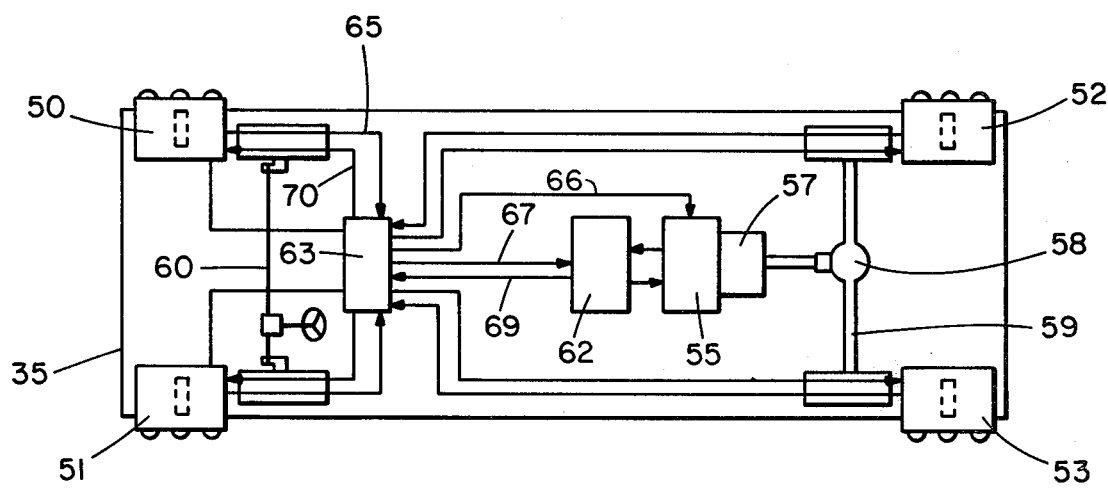
FIG. 2 is a schematic view of one of the inflatable tire vehicles.

As seen in FIGS. 2, 5 and 6, the vehicles 35 each have guide assemblies 50 and 51 positioned at the front sides of the vehicle and guide assemblies 52 and 53 positioned at the rear sides of the vehicle. These guide assemblies 50, 51, 52 and 53 engage the guide walls 44 and 45 of the trackway for laterally positioning the vehicle in the track and steering the vehicle as it travels along curves in the trackway. The guide assemblies all engage the hot rails 47 and 48 for vertically positioning the guide assemblies with respect to the vehicles 35 and also for the purpose of transmitting electric power from the hot rails to the driving motor of the vehicles.

The vehicles 35 each have an electric motor 55 which drives the rear conventional inflatable tire assemblies 56 through gear box 57, differential 58 and rear axle 59. A conventional manual steering mechanism 60 is provided on each vehicle for steering front inflatable tire assemblies 61 in conventional fashion. The vehicles 35 all have batteries 62 having a high storage and power capacity, such as a nickel cadnium battery, capable of powering the motor 55 for relatively short periods of time on the order of two hours without recharge.

A control 63 is provided for controlling the vertical position of the guide assemblies 50, 51, 52 and 53, controlling the electrical connection between the hot rails and the battery 62 and the motor 55 as well as controlling the connection between the battery 62 and the motor 55. The control 63 is essentially nothing more than conventional switches operable by the operator of the vehicle at the appropriate times. When the vehicle is in the trackway, the operator activates a suitable switch electrically connecting each of the guide assemblies to the motor through lines 65 and line 66. The control 63 also electrically connects the hot rails to recharge the battery through line 65 and line 67. Control 63 is also operable through activation of the suitable switch for electrically connecting battery 62 to drive motor 55 through lines 69 and 66.

The control 63 serves the additional function of raising the guide assemblies 50 before leaving the trackway and also lowering the guide assemblies into proper position on the trackway through lines 70.

Figure 4:
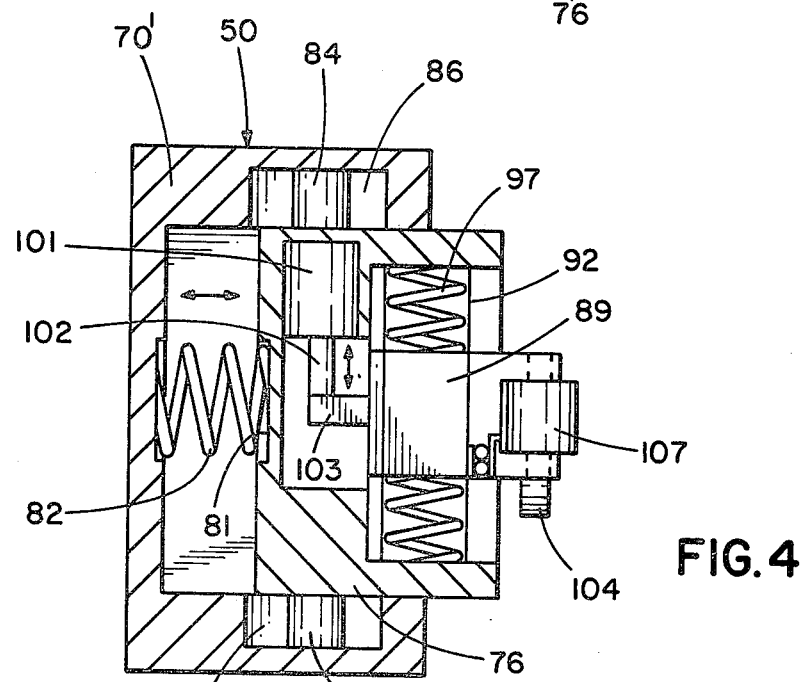
FIG. 4 is a left side view of one of the guideway assemblies shown in FIG. 3.

The guide assemblies are identical so that guide assembly 50 is illustrated in detail in FIG. 4 but it should be understood that it is the same in all respects to the other guide assemblies 51, 52 and 53. A frame member 70' is provided that is rectangular in construction and fixed with respect to the frame of the vehicle. Guide frame 70 has horizontal inside walls 71 and 72 which engage and guide a rectangular horizontal slide 76 and vertical inside walls 73 and 74. The slide 76 has side walls 77 and 79 that are spaced from the frame side walls 73 and 74 to permit pivotal movement of the slide 76 with respect to the frame 70. Slide 76 has a recessed spring seat 81 as seen in FIG. 4 that receives a heavy spring 82 that reacts at its left end against the inside back wall of frame member 70. Spring 82 has sufficient strength to stand the total side loads on the vehicle imposed by the interaction of the guide assemblies with the vertical track walls 44 and 45.

As the vehicle enters the trackway, the guide assemblies engage the vertical track walls 44 and 45 and the springs 82 will become partially compressed.

For the purpose of pivotally supporting the slide assembly 76 to accommodate for vehicle steering geometry and track imperfections, the slide 76 has upwardly and downwardly extending pivot posts 84 and 85 that slide in elongated slots 86 and 87 in the frame 70 as appears clearly in FIG. 4. The slots 86 and 87 have a width substantially equal to the diameter of the posts 84 and 85 to prevent lateral movement of the slide 76.

The slide 76 supports a roller frame 89 for vertical movement. The roller frame 89 is elongated horizontally and has guideways 90 and 91 that engage corresponding guideways 92 in the inside vertical walls 93 and 94 in a frontwardly opening recess 96 in slide 76.

The roller frame 89 is suspended within slide 76 by upper springs 97 and 98 and lower springs 99 and 100, each reacting against the slide 76 at one end and the roller frame 89 at the other. These springs serve to center the roller frame 89 within the slide and permit the roller frame 89 to be cammed upwardly and downwardly by the camming hot rails 47 and 48 in the track.

Figure 3:
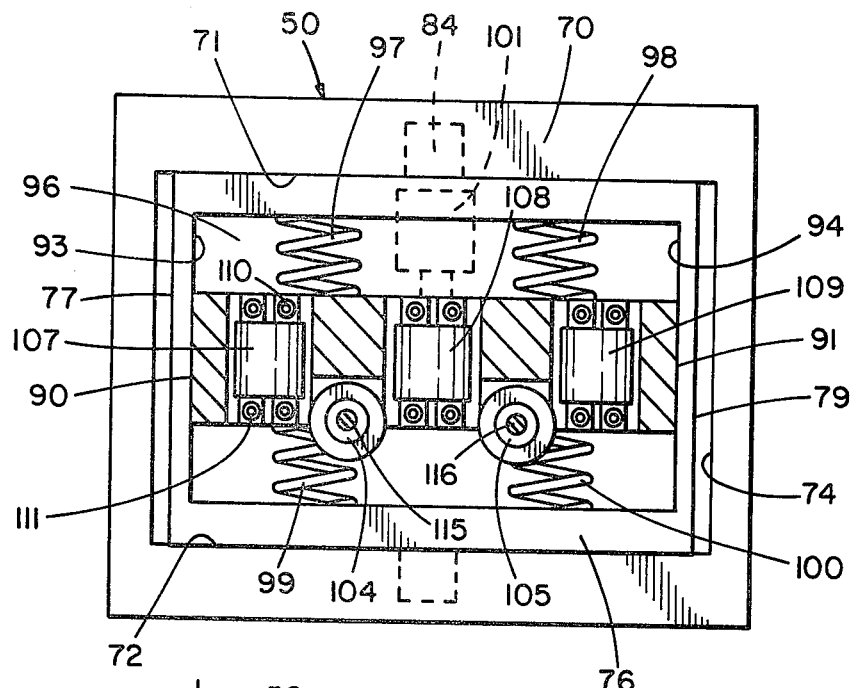
FIG. 3 is a plan view of one of the vehicle guideway assemblies.

For the purpose of retracting the roller frame 89 upwardly prior to leaving the trackway, prior to entering the trackway and also for lowering the assemblies after the vehicle enters the trackway, a raise and lower solenoid 101 is provided as illustrated in FIGS. 3 and 4. Solenoid 101 is mounted within the slide 76 and has an armature 102 connected to a rearward projection 103 extending backwardly from and connected to the slide 89. When solenoid 101 is actuated, slide 89 moves upwardly from its position shown in FIGS. 3 and 4, compressing springs 97 and 98 permitting disengagement of bottom rollers 104 and 105 from the hot rails 147 and 148 respectively.

Rollers 107, 108 and 109 are mounted for vertical rotation within the roller frame 89 by bearings 110 and 111 above and below, respectively, the rollers. The rollers 107, 108 and 109 directly engage the vertical track walls 44 and 45 to provide the final interengagement between the guide assemblies 50, 51, 52 and 53 and the track walls 44 and 45.

The roller frame 89 is positioned vertically when the vehicle is in the track by rollers 104 and 105 which are rotatably mounted within the roller frame 89 about spaced parallel horizontal axes. The rollers 104 and 105 are constructed of an electrical conducting material and suitable slip rings (not shown) engage their shafts 115 and 116 to transmit electrical current from the hot rails 47 and 48 to the conductors 65 between the guide assemblies and control 63 as seen in FIG. 2. Thus, the rollers 104 and 105 serve the dual function of positioning the roller frame 89 vertically as well as transmitting electrical current from the hot rails to the drive motor 55 and the battery assembly 62.

As the vehicles 35 enter the tracks, the operator, through control 63, actuates all of the solenoids 101 raising the roller frames 89. As the vehicle enters the trackway, with the frames 89 in the raised position, rollers 107, 108 and 109 engage the upper portions of the side wall rails 44 and 45 stabilizing the vehicle within the tracks under battery power from battery 62. The operator then deactuates the solenoids 101 and springs 97, 98, 99 and 100 serve to lower the roller frames 89 so that the rollers 104 and 105 are lowered into direct contact with the hot rails 47 and 48. The operator thereafter actuates control 63 to disconnect battery 62 from drive motor 55 and connects hot rail leads 65 to the motor 55 so that the motor 55 is thereafter powered by power from the hot rails. At the same time, control 63 is actuated to connect hot rail leads 65 from the guide assemblies to the battery assembly 62 for the purpose of charging the battery while the vehicle is on the track.

Immediately prior to exiting the trackway, the operator again actuates control 63 to raise the roller frames 89 so that the guide assemblies do not fall off the tracks in an abrupt manner. At the same time, the operator through control 63 connects battery 62 to the drive motor 55 and disconnects hot rail leads 65 from the battery and from the drive motor 55. The vehicle is then under battery power and ready to travel on conventional roadways until returning to the track or the recharge station 34 shown in FIG. 1.

Figure 7:
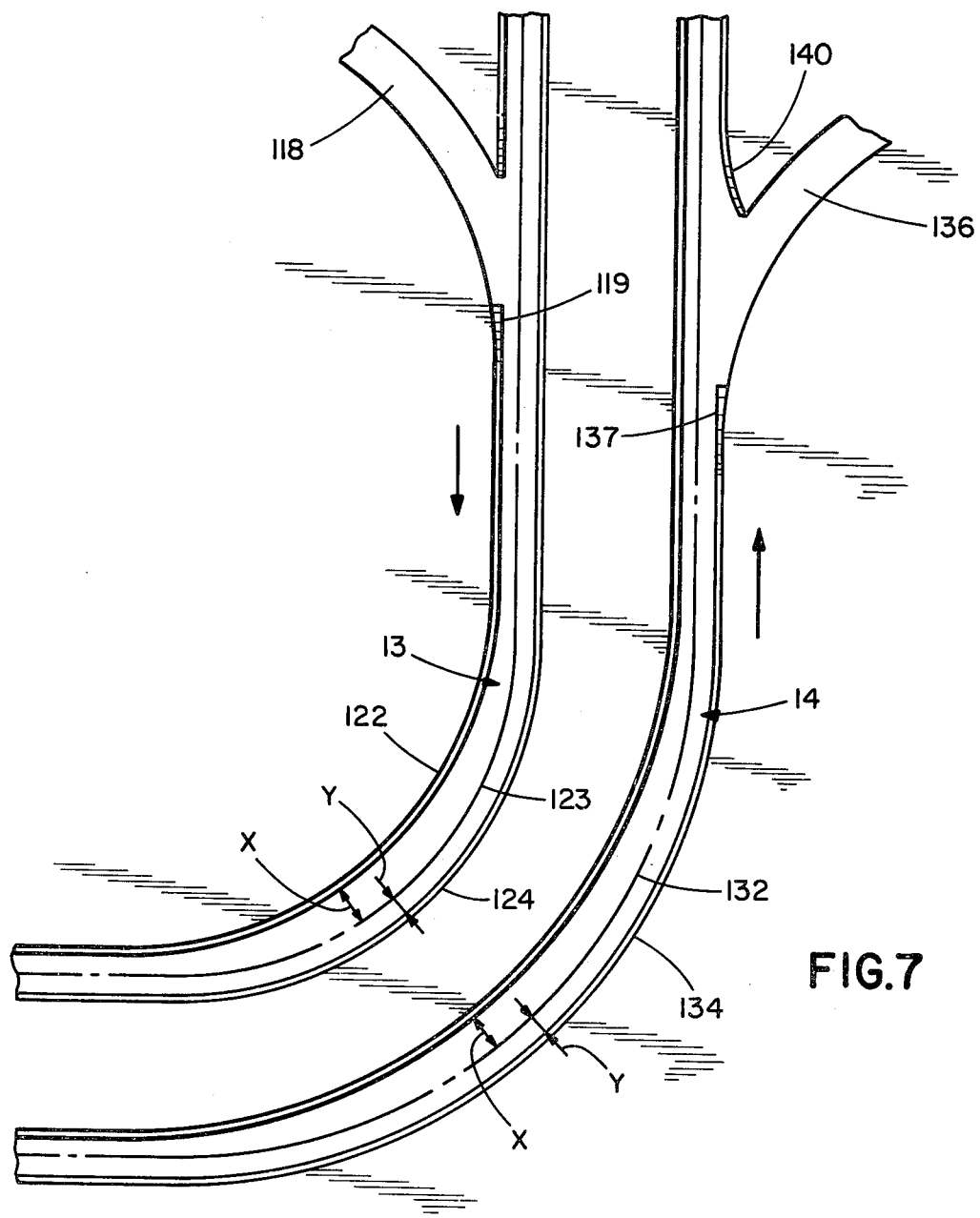
FIG. 7 is a plan view of the trackway illustrating an entrance, an exit and a curve.

In FIG. 7, sections of inbound trackway 13 and outbound trackway 14 are illustrated. The inbound trackway 13 is illustrated with an entrance ramp 118. An inside section 119 of the inbound track 119 at the leading edge of the entrance is indicated at 119 in FIG. 7 and also in FIG. 9. As illustrated in FIG. 9, the hot rail track surface 47 is curved downwardly as indicated at 120 for the purpose of camming the roller frames 50 and 52 at the right side of the vehicle upwardly as the vehicle 35 enters the inbound trackway 13 in a smooth fashion.

Camming surface 120 also serves to cam the right side guide assemblies 50 and 52 upwardly for through traffic in the inbound track 13 that enter the trackway prior to entrance 118, thereby achieving a dual function.

The trackways adjacent curves are somewhat modified to accommodate the steering geometry of the vehicles. In each of the curves, only the outside track section engages the guide assemblies and the inside track section is spaced far enough from the center line of the track so that the inside track section does not engage the guide assemblies in the curves. This arrangement prevents any interference between the inside track and the vehicles themselves, as will be appreciated by those skilled in vehicular steering geometry. More particulary and as viewed in FIG. 7, inside track section 122 is spaced a greater distance X from track center line 123 than is outside track section 124 as indicated by distance Y. Distance X is sufficiently greater than distance Y so that as the vehicle goes through the track section, the inside guide assemblies on a right turn, i.e., guide assemblies 50 and 52, will completely disengage from the inside track section 122 so that only the outside guide assemblies 51 and 53 will engage the outside track section 1 to 4. The guiding action produced by the outside track section, is of course sufficient in a curve due to the centrifugal force of the vehicle moving the outside guide assemblies into firm tracking engagement with the outside tracking section. An important feature of the present invention is that since the hot rails 47 and 48 are engageable with guide assemblies on both sides of the vehicle, it is only necessary that one guide assembly be in contact with the hot rail at any one time during the curves even though one set of guide assemblies is separated from the inside hot rail. The same advantage is attained for through traffic passing over an entrance, or an exit where the inside guide assemblies 50 and 52 are cammed off of the right hot rail.

In FIG. 8, a side view is shown of an exemplary inside rail section 122. In that section, the hot rail 47 is curved downwardly at the entrance 127 of the curve permitting roller frame 89 to smoothly leave the hot rail, and is curved upwardly at 128 at the exit section of the curve entering a straight section, permitting the roller frame to be smoothly cammed back up to the normal level of hot rail 47.

The curves in the outbound track 44 are similarly configured with inside track section 130 in the curves being spaced a greater distance 131 from center line 132 than the outside rail section 134 is from the center line. Similarly, inside track section 130 is similarly configured to the inside track section 122 illustrated in FIG. 8, for the same reasons.

The outbound track section has an exemplary exit illustrated at 136. The right track section 137, approaching the exit is illustrated in FIG. 11. It will be noted that the hot rail is curved downwardly in this section as illustrated at 138 for the purpose of smoothly camming the inside or right roller frames 89 downwardly for both through vehicles as well as exiting vehicles. With through vehicles, the electrical contact is maintained between the hot rail and the drive motor by the left guide assemblies 51 and 53. To permit the right trucks 50 and 52 to be cammed back up for through vehicles passing exit 136, outwardly curved track section 140 is provided to smoothly track the right hand guide assemblies or trucks. This section is illustrated in a side view in FIG. 10. Hot rail 47 has a curved section 141 for smoothly camming the right roller frames 89 upwardly to the normal hot rail level as the through traffic vehicles pass the exit 136.

What is claimed is:

1. A transportation system, comprising; a vehicle trackway having a plurality of entrances and exits, a plurality of vehicles adapted to travel in the trackway or off the trackway, said vehicles having inflatable tire wheel assemblies, each of said vehicles having steering means for at least one of said inflatable tire wheel assemblies, said trackway including a horizontal guide surface and a vertical guide surface, each of said vehicles having guide means engageable with the horizontal guide surface and the vertical guide surface, and means on each of said vehicles for positively moving the guide means vertically into engagement with said horizontal guide surface while the vehicles are moving adjacent the trackway.

2. A transportation system, comprising; a vehicle trackway, said trackway having a guide wall, a plurality of vehicles in said trackway having frames, each of said vehicles having guide assemblies, said guide assemblies including a vertically movable roller frame, roller means in said roller frame engageable with said guide wall, and resilient means on said vehicle frame resiliently biasing said roller frame vertically including means pivotally supporting said roller frame about a vertical axis.

3. A transportation system, comprising; a vehicle trackway having a generally vertical guide wall and a generally horizontal guide wall, a plurality of vehicles in said trackway having guide assemblies, said guide assemblies including a vertically movable roller frame, resilient means biasing said roller frame toward said vertical guide wall, roller means in said roller frame engageable with said generally vertical guide wall, and guide means on said roller frame engageable with the trackway generally horizontal guide wall.

4. A transportation system as defined in claim 3, wherein said generally horizontal guide wall is vertically depressed adjacent at least one of said exits or enrances.

5. A transportation system as defined in claim 3, wherein said generally horizontal guide wall is vertically depressed at the inside curve section of said trackway.

* * * * *